Patented Mar. 11, 1941

2,234,479

UNITED STATES PATENT OFFICE 2,234,479

CAPSULE AND METHOD OF MAKING THE SAME

Robert P. Scherer, Detroit, Mich.

No Drawing. Application March 13, 1936, Serial No. 68,782. Renewed June 30, 1939

1 Claim. (Cl. 167—83)

This invention relates to capsules and more particularly to improved sealed, filled elastic capsule bodies or similar soluble containers and to an improved method of manufacturing the same.

In the manufacture of filled, sealed, water soluble capsules it has been the practice to fill water soluble shells with mixtures of capsulated material which were practically insoluble in water. This has been necessary for the reason that the water soluble capsule shell contains ingredients, such as water, into which water soluble capsule content mixtures are dissolvable. This would give rise to an action in which the soluble filler would pass into the shell and ultimately break down and destroy the wall structure of the shell. Accordingly it has been found necessary to employ fillings for the capsule shells which were virtually insoluble in water in order to prevent interaction between the filling and the shell.

The problem of associating a water soluble filler in a water soluble capsule shell has been solved by the invention described herein. As a result of this invention it is now possible to capsulate a water soluble filler within a water soluble capsule shell without serious destructive interaction therebetween. Numerous advantages arise as a result of this invention. It is now possible to provide fillers for capsules which can be immediately acted upon by the digestive organs as soon as the capsule has been broken open or ruptured. The fillers being in completely soluble form are readily assimilated into the body. It is also possible to improve the use and appearance of the solutions into which water soluble capsules of this character are placed by providing a capsule body, including the shell and capsulated material therein, which will form completely soluble solutions. These solutions will be free of any deposit or film of insoluble substance which detracts from the appearance or utility of the solution.

Another object of this invention is to provide a novel process for manufacturing a completely water soluble capsule of the character described above. The process includes the steps of inhibiting any serious action between the water soluble parts of capsules, maintaining the moisture content of the shell at a minimum, and rapidly drying the capsule shell in order to remove as much of the moisture from the shell as possible in the shortest time. This process requires that special attention be devoted to the compositions of the capsule shell and filler and to the physical conditions under which the capsule is made as will appear more fully hereinafter.

Other objects and advantages of this invention will appear more fully from the following specification and claim.

In carrying out this invention, the capsule shells may be made in any suitable way well known in the art. They may be made out of gelatinous material rendered plastic by the presence of water. The sealed elastic type of capsules are usually filled with a filler material or medicament while they are made and just prior to their being sealed. After the capsule shell has been produced and filled with the desired ingredient or medicament it is soft and elastic and the shell contains a considerable percentage of water. Each capsule is then allowed to dry and harden until it forms a substantially rigid shell. It is immediately after manufacture and before complete hardening when interaction between the shell and the filler or medicament is most likely to take place. The water content of the shell is highest at this time and water soluble fillers tend to be soluble or miscible in the water content of the shell. For this reason it has been customary to fill the capsules with material insoluble in water or in any other ingredient employed in the capsule. After the shell has dried and hardened, it is substantially impervious to substances generally carried in the shell and all interaction between the shell and the filling is stopped.

I have found that a water soluble capsule can be manufactured containing a water soluble filler if certain considerations are taken in regard to the composition of the filler material and the shell and if certain physical conditions are present.

I have found that it is possible to reduce or inhibit the attraction or affinity of water soluble fillers for certain of the ingredients in the shell by forming such fillers of water soluble solvents or vehicles having the desired medicaments dissolved therein to substantially the saturation limit of the vehicles. I have found that this reduces the affinity of the water soluble filler for the water content of the shell to such an extent that regardless of whether some dissolving action occurs between the filler and the shell, the latter hardens to its impermeable state before any appreciable damage is done to the shell. Comparison of capsules wherein the water soluble content vehicle carries medicament to its saturation point with capsules wherein such vehicle carries a substantially smaller quantity of medicament demonstrate the pronounced merit of the instant improvement. In the latter cases, the shell broke down before it had completely hardened whereas in the first cases the shell remained permanently intact and showed no difference from shells which contained water insoluble fillers.

Other factors may be varied to assist in the production of a completely water soluble capsule body. When the plastic gelatinous mass is prepared for forming the capsule shell, the minimum amount of water necessary to form a fusible mass of gelatin should be used. By keeping the water content of the shell to a minimum, the mutual attraction of water soluble fillers for the water content of the shell is reduced as much as possible.

Another factor which may assist in the production of a completely water soluble capsule body is the rate at which the capsule shell is dried immediately after its manufacture. It has been the practice in the art to allow the capsules to dry slowly in order to obtain uniform results. I have found that the capsules may be rapidly dried under certain physical conditions without harming the uniformity of production. It is during the drying period when the soft elastic capsule shell contains the highest percentage of water and is most susceptible to attack by the filler substances. By subjecting the capsule to the forced circulation of warm dry air this period may be considerably shortened. The warm dry air rapidly absorbs the moisture from the shell. This reduces the opportunity for the water soluble solvent to dissolve in the moisture content of the shell and enables the shell to harden to its impermeable state before any appreciable damage occurs to the shell.

A capsule having a water soluble shell and a completely water soluble filler contained therein may be prepared as follows: The shell is formed in any suitable way well known in the art but care should be taken to keep the presence of water at a minimum. A filler material of vanillin and coumarin is dissolved in a water soluble vehicle or solvent such as diethylene glycol monoethyl ether until the latter is practically saturated with the material. The vehicle is soluble or miscible in water. By saturating the vehicle with a solute, such as vanillin and coumarin, I have found that its affinity for the water content of the shell is very greatly reduced, so much so that the shell hardens to its impermeable state before any noticeable change is made upon the shell by the vehicle. After the shell has been formed with the filler material sealed therewithin, it is soft and elastic. It is then rapidly dried in the manner described above in order to remove the water content from the shell as quickly as possible.

Other solvents of this character may probably be used for dissolving the filler material. Solvents such as diethylene glycol monobutyl ether and diethylene glycol monomethyl ether may probably be used. Various organic substances are possible solvents such as the aldehydes and ketones.

The filler in the capsule shell need not be a completely clear solution. The filler may contain more solute than the solvent can dissolve. The filler will then be in a pasty mass which may be desirable in certain instances in order to obtain the required dosages without increasing the size too much. The water soluble solvent will carry the excess solute into a water solution after the shell has been dissolved.

The medicament which is dissolved in the solvent or vehicle may be either in solid or liquid form and may be either soluble or insoluble in water. Being dissolvable in the water soluble vehicle it readily passes with the vehicle into a water solution and forms a clear solution thereof. It is therefore possible as a result of this invention to manufacture capsules containing a filler material which is normally insoluble in water but which can be carried into a water solution by employing a water soluble solvent for the material. The water soluble character of the solvent will carry the normally insoluble material directly into a water solution where it will form a completely soluble solution.

It may also be possible by means of this invention to prevent an active ingredient or medicament from attacking the shell by dissolving the medicament in a suitable solvent substantially to the saturation limit of the latter. The marked mutual affinity of the solute and the solvent will inhibit to a large degree any tendency on the part of either to attack or dissolve into the shell.

It is to be understood that the term "medicament" wherever used in the specification and claims refers generically to any substance which it is desired to capsulate.

What I claim:

In the manufacture of capsule bodies having a water soluble gelatinous shell and a filler substance therein including diethylene glycol monoethyl ether, the method of inhibiting the action of said ether compound upon the shell content which comprises substantially saturating the same with vanillin and coumarin.

ROBERT P. SCHERER.